United States Patent
Dohmann et al.

(10) Patent No.: US 9,776,354 B2
(45) Date of Patent: Oct. 3, 2017

(54) EXTRUSION PROCESS

(71) Applicant: American Maplan Corporation, McPherson, KS (US)

(72) Inventors: Heinrich Dohmann, Höxter (DE); Peter Jessen Jürgensen, Frederikssund (DK)

(73) Assignee: American Maplan Corporation, McPherson, KS (US)

( * ) Notice: Subject to any disclaimer, the term of this patent is extended or adjusted under 35 U.S.C. 154(b) by 688 days.

(21) Appl. No.: 14/186,101

(22) Filed: Feb. 21, 2014

(65) Prior Publication Data

US 2014/0239530 A1   Aug. 28, 2014

(30) Foreign Application Priority Data

Feb. 24, 2013 (DE) .................. 10 2013 202 996
Feb. 24, 2013 (DE) .................. 10 2013 202 997

(51) Int. Cl.
*B29C 47/88* (2006.01)
*B29C 47/08* (2006.01)
(Continued)

(52) U.S. Cl.
CPC ...... *B29C 47/0893* (2013.01); *B29C 47/0023* (2013.01); *B29C 47/8815* (2013.01);
(Continued)

(58) Field of Classification Search
CPC . B29C 47/0891; B29C 47/0893; B29C 47/92; B29C 2947/9298; B29C 47/1018;
(Continued)

(56) References Cited

U.S. PATENT DOCUMENTS 4,573,897 A * 3/1986 Piazzola ................. B29C 45/72
425/143
4,870,760 A * 10/1989 Graff ....................... F26B 21/04
34/473
(Continued)

FOREIGN PATENT DOCUMENTS

AT      344399 B     7/1978
DE     2403295 A1    1/1975
(Continued)

*Primary Examiner* — Jeffrey Wollschlager
(74) *Attorney, Agent, or Firm* — Hamilton, Brook, Smith & Reynolds, P.C.

(57) ABSTRACT

A method for using the quantity of heat output from an extrudate during a cooling operation in an extrusion process, wherein a fluid, in particular air, is guided along the extrudate and/or through the die counter to an extrusion direction, at least some of the heat from the extrudate and/or the die is transmitted to the fluid, the heated fluid is supplied from a first sub region of a process chain, comprising at least one die, a calibrating and cooling device and a take-off apparatus, via a connecting region, preferably consisting of at least one connecting pipe, to a second sub region of the process chain, comprising at least one suction apparatus. In the connecting region, an extraneous fluid can be added to the heated fluid in order to reduce the actual temperature of the heated fluid at least below a predetermined maximum value before said fluid is supplied to the second sub region of the process chain.

13 Claims, 4 Drawing Sheets

(51) Int. Cl.
*B29C 47/92* (2006.01)
*B29C 47/78* (2006.01)
*B29C 47/00* (2006.01)
*B29C 47/10* (2006.01)
*B29C 47/90* (2006.01)

(52) U.S. Cl.
CPC ........ B29C 47/8895 (2013.01); B29C 47/908 (2013.01); B29C 47/92 (2013.01); *B29C 47/0009* (2013.01); *B29C 47/0891* (2013.01); *B29C 47/1018* (2013.01); *B29C 47/786* (2013.01); *B29C 47/90* (2013.01); *B29C 2947/926* (2013.01); *B29C 2947/9298* (2013.01); *B29C 2947/92104* (2013.01); *B29C 2947/92209* (2013.01); *B29C 2947/92476* (2013.01); *B29C 2947/92704* (2013.01); *B29C 2947/92838* (2013.01); *B29C 2947/92971* (2013.01); *Y02P 70/263* (2015.11)

(58) Field of Classification Search
CPC .......... B29C 2947/92476; B29C 47/90; B29C 47/0009; B29C 2947/926; B29C 2947/92971; B29C 47/8815; B29C 2947/92838; B29C 47/786; B29C 2947/92704; B29C 2947/92209; Y02P 70/263

See application file for complete search history.

(56) References Cited

U.S. PATENT DOCUMENTS

| | | | | |
|---|---|---|---|---|
| 4,872,397 | A * | 10/1989 | Demeter | F24F 1/00 236/49.5 |
| 5,525,289 | A * | 6/1996 | Lupke | B29C 47/0023 264/150 |
| 6,163,976 | A * | 12/2000 | Tada | F26B 3/20 34/168 |
| 6,389,828 | B1 * | 5/2002 | Thomas | F24F 5/0017 62/185 |
| 6,551,534 | B1 * | 4/2003 | Kirjavainen | B29C 47/0023 264/211.12 |
| 6,951,065 | B2 * | 10/2005 | Graeff | F26B 9/063 34/364 |
| 8,702,410 | B2 | 4/2014 | Hackl et al. | |
| 2011/0285051 | A1 * | 11/2011 | Hackl | B29C 47/0023 264/209.1 |
| 2013/0032960 | A1 * | 2/2013 | Russo | B29C 47/0033 264/40.5 |
| 2014/0175695 | A1 * | 6/2014 | Eloo | B29B 17/0005 264/143 |

FOREIGN PATENT DOCUMENTS

| | | |
|---|---|---|
| DE | 102008047207 A1 | 4/2010 |
| DE | 102008047211 A1 | 4/2010 |
| DE | 102010031424 A1 | 1/2012 |
| DE | 102010064412 A1 | 7/2012 |
| JP | S56144141 A | 11/1981 |

* cited by examiner

EXTRUSION PROCESS

RELATED APPLICATIONS

This application claims priority under 35 U.S.C. §119 or 365 to German Application No. DE 102013202996.9, filed on Feb. 24, 2013 and also claims priority to German Application No. DE 102013202997.7, filed on Feb. 24, 2013. The entire teachings of the above applications are incorporated herein by reference.

BACKGROUND OF THE INVENTION

Extrusion processes require the heating and melting of plastic materials.

SUMMARY OF THE INVENTION

The invention relates to a method for using the quantity of heat output from the extrusion or extrudate during the cooling operation in an extrusion process for drying or preheating plastic granules, wherein a fluid, in particular air, is guided along the extrudate and/or through the die counter to the extrusion direction, at least some of the heat from the extrudate and/or the die is transmitted to the fluid, the heated fluid is supplied from a first sub region of the process chain, comprising at least one die, a calibrating and cooling device and a take-off apparatus, via a connecting region, preferably consisting of at least one connecting pipe, to a second sub region of the process chain, comprising at least one suction apparatus.

During the production of plastic parts, a thermoplastic present in the form of granules first of all generally has to be firstly melted and then brought in the form of a thermoplastic melt into the desired final shape of the plastic part. This can take place, firstly, by injection into a suitable mold for this purpose, or by extrusion in a continuous process. In both cases, heat first of all has to be supplied to the plastic granules in order to melt the latter, and, after the shaping, heat is subsequently withdrawn again from the shaped plastic part so that the latter remains dimensionally stable.

With the tendency for continuously rising energy costs, it is therefore not only economical, but also highly expedient from the aspect of environmental protection to deal with methods which make it possible to minimize as far as possible the energy which is introduced and which the system requires to be withdrawn again from the process, or to use said energy for other processes.

DE 10 2007 050 949 A1 already deals with this subject and proposes a method for using energy in the cooling of extrusion profiles, in which energy in the form of heat is supplied for melting the plastic and, after the shaping, heat is withdrawn from the plastic at least in the die, calibrating means and cooling bath until said plastic is self-supporting. According to the invention, provision is made here for a cooling medium for cooling purposes to pass through the extrusion line counter to the extrusion direction, wherein the medium used for the cooling is guided from one apparatus to the next. A type of circuit is therefore already proposed here, in which circuit the used cooling medium is conveyed from one apparatus to the next, and therefore the cooling medium becomes warmer from station to station and can then be used, for example, for heating or for preparing hot water. Accordingly, this already also involves the basic concept of making the energy which is introduced usable for further processes.

DE 10 2010 064 412 A1 already goes a step further here and proposes a method for maintaining the heat flow output from an extrudate to a fluid. In this case, a fluid, primarily air, is conducted counter to the extrusion direction to a plastic pipe and through the die, which forms the plastic pipe, said air, after being appropriately moderated, then leaving the process via a fluid outlet opening. The essence of the invention consists in optimizing the fluid flow in such a manner that the greatest possible quantity of heat is withdrawn from the plastic, with this being identical as far as possible at all points over the entire length of the extrudate so that an optimum cooling process can be achieved.

It is the object of the invention to make as far as possible up to 100 percent of the quantity of heat output in an extrusion process usable for a further process without the energy carrier to which said quantity of heat has been supplied being able to cause damage in the subsequent process chain, which could occur, for example, in the event of excessive final temperatures of the energy carrier.

The achievement of the object in conjunction with the preamble of claim 1, which recites a method for using a quantity of heat output from an extrusion or extrudate during a cooling operation in an extrusion process, wherein a fluid, in particular air, is guided along the extrudate and/or through the die counter to an extrusion direction, at least some of the heat from the extrudate and/or the die is transmitted to the fluid, the heated fluid is supplied from a first sub region of a process chain, comprising at least one die, a calibrating and cooling device and a take-off apparatus, via a connecting region, preferably consisting of at least one connecting pipe, to a second sub region of the process chain, comprising at least one suction apparatus, and comprises the fact that the temperature of the fluid does not exceed a predetermined maximum value, wherein, in the connecting region, an extraneous fluid can be added to the heated fluid in order to reduce the actual temperature of the heated or mixed fluid at least below the predetermined maximum value before said fluid is supplied to the second sub region of the process chain.

The quantity of heat output can be used for drying and/or preheating plastic granules, wherein the second sub region (14) is followed by a preheating and/or drying process, wherein, in a transition region between the second sub region and the drying process, the flow velocity and the temperature of the total or mixed fluid can be lowered.

It is ensured by means of this proposed method that so much outside, external or extraneous fluid—this will generally be ambient air—is added to the heated fluid—air will primarily be used here—i.e. to the heated air that the latter can never reach a temperature which could cause damage to components in the subsequent process. It is namely appropriate, for example, first of all to clean said air drawn through the extrudate in a filter, since the air has possibly been supplied with pollutants which emerge from the plastics compound and should not necessarily be directly output again into the environment. Furthermore, the heated air could contain additives which could have a tendency to spontaneously ignite above a certain temperature range. For this reason, it has to be ensured that the heated air does not enter a temperature range at which said substances described, for example, react with the filter fleece in the filter mentioned and cause damage. The fluid can then be directly used in the subsequent drying process. If the flow velocity is too high, it is minimized by opening a drain valve in the transition region. If the temperature for the drying or preheating process is still too high, additional extraneous air can likewise be added in the transition region.

In order to check this process of cooling down the heated fluid, it is provided, according to a development, to measure the fluid temperature via a suitable temperature measuring device before the fluid is supplied to the second sub region of the process chain. This can be undertaken by means of suitable temperature sensors or any other known temperature measuring appliances. The fluid temperature can also be measured at the outlet of the second sub region. By means of this check measurement, the cooling down of the fluid is monitored, and it is possible to be able to intervene into the overall process if the desired fluid temperature has nevertheless not been reached.

However, the measuring of the fluid temperature before the fluid is supplied to the second sub region also has the advantage that, if the fluid temperature at the outlet of the first sub region is additionally measured, the quantity of the extraneous air to be supplied can be controlled or regulated. The quality of extraneous fluid can be influenced via a shutoff valve, which can be controlled and/or regulated in dependence on the fluid temperature at the outlet of the first sub region in order to keep the fluid temperature below the maximum temperature at the inlet of the second sub region. This temperature measurement makes it namely possible to know at which temperature the fluid leaves the first sub region and, depending on the predetermined maximum temperature, to determine, by means of known regulating technology, the quantity of the extraneous air which is required. In this case, it is also of advantage to record the temperature of the extraneous air, since, of course, more extraneous air has to be added to the heated fluid the warmer the extraneous air itself is. Depending on the sphere of use, it may be necessary to precool said extraneous air via suitable means in order to be able to achieve the desired cooling of the heated fluid. The supply of the extraneous air can be controlled via a regulable, regulated, or regulating shutoff valve, but also via simple flaps. In this connection, it is readily conceivable to determine the quantity of extraneous air via a manually displaceable flap which can be opened, for example, by up to 25, 50 or 100 percent. Of course, the quantity of extraneous air can also be influenced via the size of the respective opening or openings. In each case, it is ensured by the quantity of extraneous air that the fluid temperature at the inlet of the second sub region is kept below the maximum temperature.

In an advantageous manner, the temperature measurement of the fluid is connected to the system control, and therefore, when a limit value of the temperature, i.e. a limit temperature lying at a predetermined value below the maximum temperature, in any form is reached, an alarm signaling device is activated. This can be, for example, the activation of an acoustic alarm or of a flashing alarm, i.e. an optical alarm, or the issuing of a message on the display of the system control. With the technology known nowadays, it is also possible to pass an alarm message of this type within a company network to certain PCs or even to send an e-mail to determined receivers and to send an SMS to a cell phone. Of course, said limit temperature above which an alarm is triggered is stored in the system. This can be a predetermined value below the maximum temperature or a value which can be determined by means of a factor of the maximum value. When said range between said limit temperature and the maximum temperature is reached, further measures can be triggered by the system. According to a development, it is provided in each case that, when the maximum temperature is reached, an emergency shutdown of the entire system is triggered. By means of this measure, it is always ensured, if all of the previously initiated alarm functions have not been effective, that the system can be switched off before damage to systems or harm to staff can arise. In the case of customary HDPE types PE 100, the maximum temperature should in practice be 150° C. and the limit temperature 130° C., and therefore above a fluid temperature of 130° C., an alarm would be triggered and, when a temperature, for example, above 145° C. is reached, the emergency shutdown of the system would be activated.

If it is then necessary to add extraneous air to the heated fluid so that the fluid temperature is reduced, the flow velocity of the fluid has to be influenced. This is because, due to physical conditions, the air flow runs along the path of least resistance. If a bypass, a shutoff valve or a flap is then opened in order to allow extraneous air to flow in, this could lead, with the flow velocity of the fluid remaining the same, to less fluid being drawn along the extrudate and/or through the die counter to the extrusion direction, since the flow resistance here is greater than in the region of the entry of the extraneous air. In order to compensate for this, the flow velocity can be increased or minimized by the suction apparatus, and can include the velocity of the mixed fluid.

Therefore if, for example, in order to lower the outgoing air temperature, extraneous air is added to the air flow from the first sub region via the shutoff valve, the suction apparatus has to increase the flow rate in accordance with the proportion of extraneous air. With the aid of an additional volumetric flow measurement in the first sub region or with the aid of the extraneous fluid, the suction apparatus can always keep the quantity of heat from the first sub region constant, by corresponding control and/or regulating technology, despite the inflow of extraneous air. The volumetric fluid of the fluid and/or the volumetric flow of the extraneous fluid can be measured. The suction power of the suction apparatus can be controlled and/or regulated in dependence on the volumetric flow measurement of the heated fluid and/or extraneous fluid. In the transition region, further extraneous fluid can be added or fluid can be drained.

By means of this regulation of the flow velocity of the fluid, it is ensured that the quantity of heat output in the first sub region of the process chain, i.e. substantially corresponds to the quantity of heat output from the extrudate and/or die, or the sub region, at the end of the process chain. By means of the proposed method, the temperature of the energy carrier, in this case the air or the fluid, which is supplied for further use to another process, can be lower than the temperature of the fluid passing through during the cooling of the extrudate and of the die. However, the quantity of heat which has been transferred to the energy carrier from the extrudate and/or the die in the cooling process is substantially identical to the quantity of heat which is transferred to the subsequent process. It is particularly advantageous if the supply of further extraneous air is controlled and/or regulated. This is possible if the temperature ($T_3$) and, at the same point, the volumetric flow are determined. The fluid is therefore optimally provided for the subsequent process.

The effect therefore intended to be achieved with the invention is that not only the faults, but also the taking on of very different energy quantities and embodiments are made possible. That is to say, the volumetric flow of air can be very large, but the temperature can be relatively low. Or the volume metric flow is relatively small, but the temperature is very high. Since, on an extrusion line, small and large pipes are moved at also different flow rates, different temperatures and volumetric flows can also arise. Furthermore, in an extreme case, the subsequent process has to also manage entirely without the energy from the extrusion process. This is the case, for example, at the starting of the extrusion line. It can be stated in summary that the subsequent process can, as far as possible continuously, use the energy available from the extrusion process, and if said energy becomes too much, can also conduct the energy away again.

The present invention can also provide an extrusion apparatus or line including a die for receiving plastic melt from an extruder and forming a plastic extrusion or profile. A first sub region of a process chain can include a die, a calibrating and cooling device, and a take-off apparatus. A second sub region of the process chain can include a suction apparatus. A connecting region including a connecting pipe, can connect and be between the first sub region and the second sub region. A fluid comprising air can be guided along at least one of the extrusion and the die, counter to an extrusion direction. At least some of the heat from at least one of the extrusion and die can be transmitted to the fluid in the first sub region forming heated fluid. In the connecting region, an external fluid can be added to the heated fluid through an external duct that is in communication with the connecting pipe, to reduce the temperature of the heated fluid to at least below a predetermined maximum value before the heated fluid is supplied to the second sub region of the process chain.

In particular embodiments, a preheating and/or drying region for drying and/or preheating plastic granules, can follow and be connected to the second sub region by a transition pipe in a transition region. The transition region can lower flow velocity and/or temperature of the heated or mixed fluid with at least one of an inlet and outlet in communication with the transition pipe.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

An apparatus according to the invention is shown schematically in the drawings, in which.

DETAILED DESCRIPTION OF THE INVENTION

A description of example embodiments of the invention follows. The teachings of all patents, published applications and references cited herein are incorporated by reference in their entirety.

Figure 1:
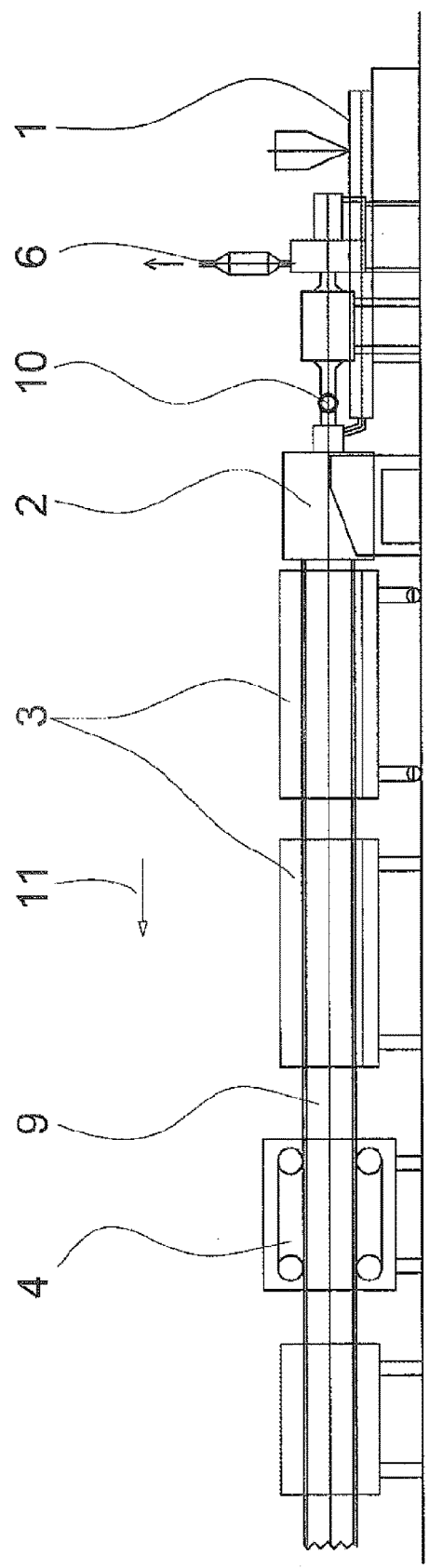
FIG. 1 shows an extrusion line.

FIG. 1 shows a typical extrusion line as is used nowadays for extruding profiles, whether for the production of window profiles or pipes. The figure shows an extruder 1 in which plastic is melted and is continuously delivered into the extrusion die 2 for shaping. The extrusion die is followed by a calibrating and cooling device 3 and, depending on the profile, use may be made of further cooling stations. The cooling stations are adjoined by a take-off apparatus 4. In order to cut the endless profiles 9 to the desired length, there is subsequently generally (not illustrated) a separating apparatus. A fluid is drawn counter to the extrusion direction 11 by means of a suction apparatus 8 through the extrusion or extrudate 9, here a plastic pipe, and through the die 2 and supplied via a connecting pipe to an air outlet 6.

Figure 2:
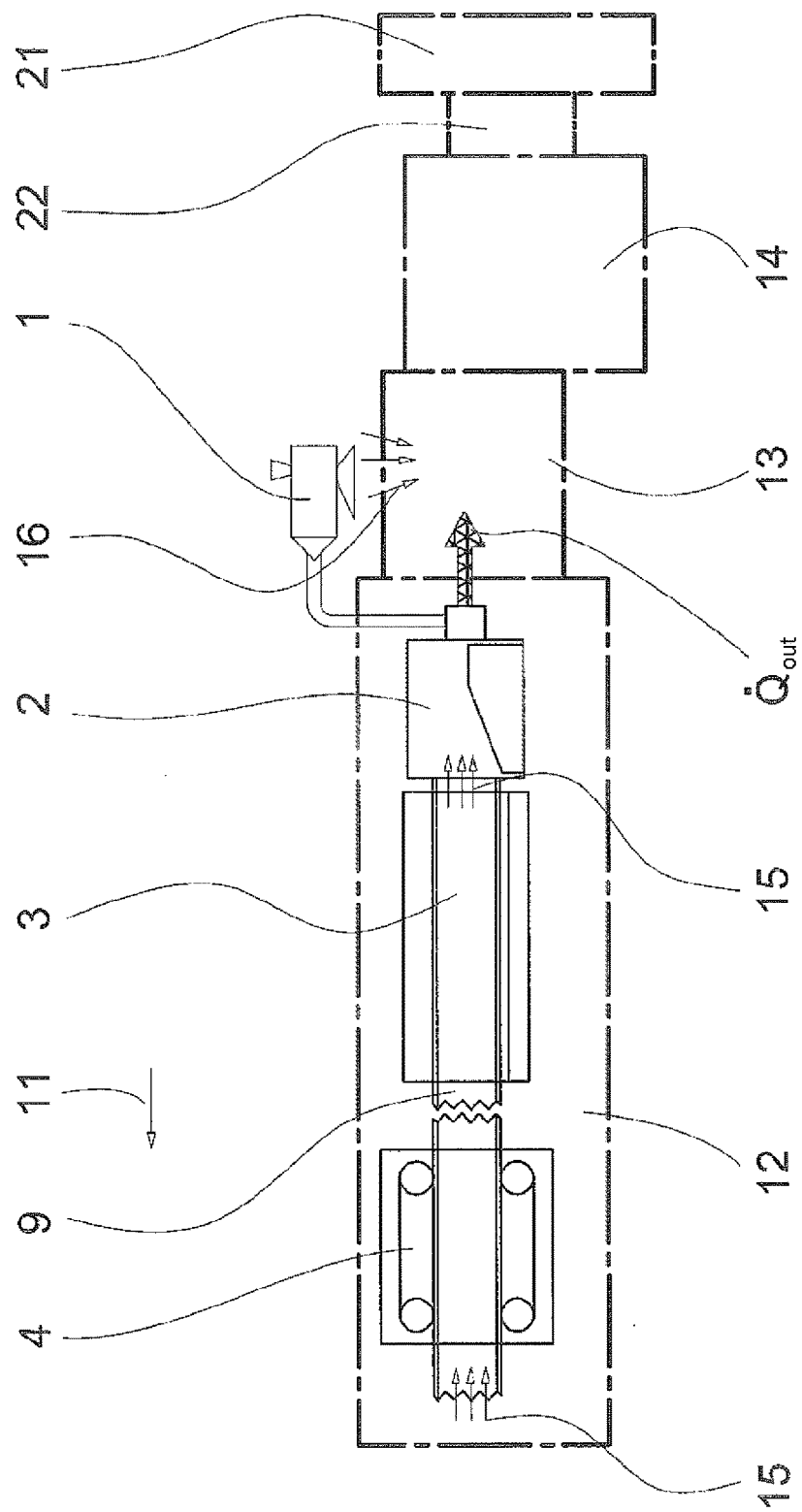
FIG. 2 shows subregions of the process chain.

FIG. 2 shows a sub region of said extrusion line. The extruder 1 which transfers the plastic melt to a die 2 and in which a plastic pipe is formed can again be seen. The dimensional stability is provided in the calibrating and cooling station 3. Further cooling stations can follow until the dimensionally stable pipe is delivered in the extrusion direction 11 via the take-off means 4. A first sub region 12 of said process chain is marked by means of a chain-dotted or phantom line. Said sub region comprises at least the die 2, the cooling and calibrating station 3 and the take-off means 4. A fluid 15, generally ambient air, is conveyed through said first sub region counter to the extrusion direction 11 along the wall, this can be the inner and/or outer wall, of the plastic pipe, wherein the air flow can likewise flow around the die 2 or subregions of the die 2. In said sub region 12, energy in the form of heat is transmitted to the air flow 15. This quantity of heat is indicated symbolically by a thick arrow in the form of $\dot{Q}out$. Said quantity of heat $\dot{Q}out$ is transferred to a second sub region 14, indicated here by a chain-dotted or phantom black box. A connecting region 13 is located between the first sub region 12 and the second sub region 14. Within said connecting region 13, an outside, external or extraneous fluid 16 can be added to the fluid 15. The sub region 14 is followed by the transition region 22 and the preheating and/or drying region 21.

Figure 3:
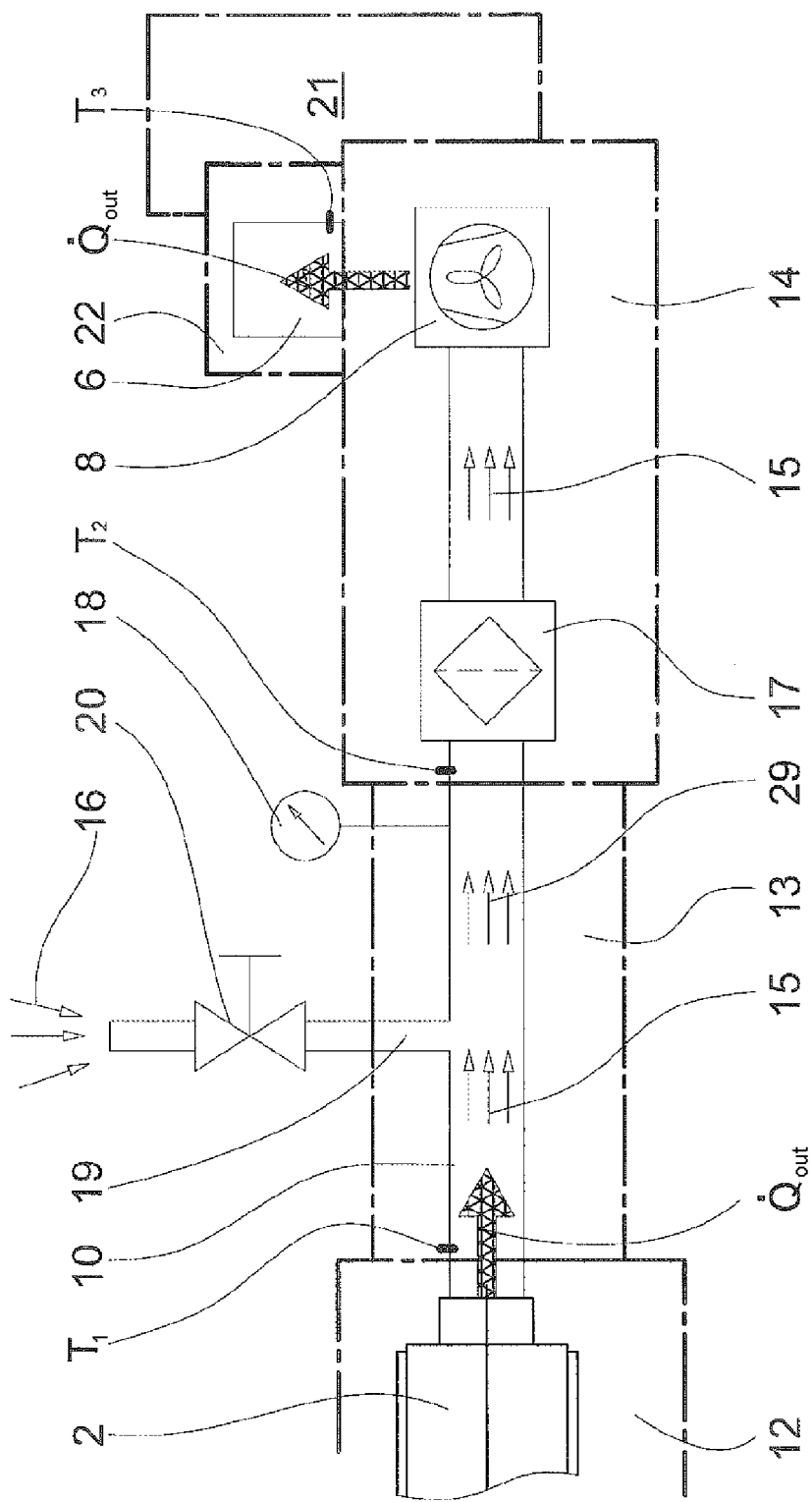
FIG. 3 shows further subregions of the process chain.

FIG. 3 virtually follows FIG. 2. The sub region 12 with the die 2 is slightly indicated schematically, and the thick arrow again symbolizes the quantity of heat $\dot{Q}out$ output from the first sub region 12. The fluid 15 flows through the connecting region 13 in a connecting pipe 10. The connecting pipe 10 is connected to an outside, external, or extraneous air duct 19 via which extraneous air 16 can be sucked up. The quantity of the extraneous air 16 is regulated via a shutoff valve 20. As already described further above, it is possible for the large number of simple, manually operable slides up to complex system controls to be controlled or regulated. The temperature of the fluid at the end of the connecting region 13 and therefore at the inlet of the sub region 14 can be measured via a temperature measuring device 18. It is thereby thus ensured that the air transmitted into the sub region 14 never reaches the maximum value. In this proposed apparatus, the fluid temperature at the beginning of the connecting region 13 can additionally be measured, as a result of which the temperature-dependent control and regulation of the extraneous air 16 is made possible.

In the example illustrated according to FIG. 3, the fluid in the sub region 14 is first of all guided through a filter 17 and then supplied to the air outlet 6. Said air outlet 6 is then followed by further processes which use the quantity of heat $\dot{Q}out$ removed in the described process chain. This region 21 is indicated schematically by a chain-dotted or phantom line. The chain-dotted or phantom line around the region 22 symbolizes a transition region. The sub region 14 is again followed by the transition region 22 and the preheating and/or drying region 21.

In order to carry out the entire method, a suction device 8 which is illustrated schematically here and sucks the fluid 15 through the entire process chain is required. In an advantageous manner, the suction apparatus 8 is also connected to the system control, in which the fluid temperatures are also entered as process variables, and therefore via the control and hence, firstly, via the shutoff valve 20, the quantity of extraneous air 16 to be supplied and, secondly, also the flow velocity of the fluid 15 can be controlled and regulated via the suction device 8, for example by means of a ventilator.

Figure 4:
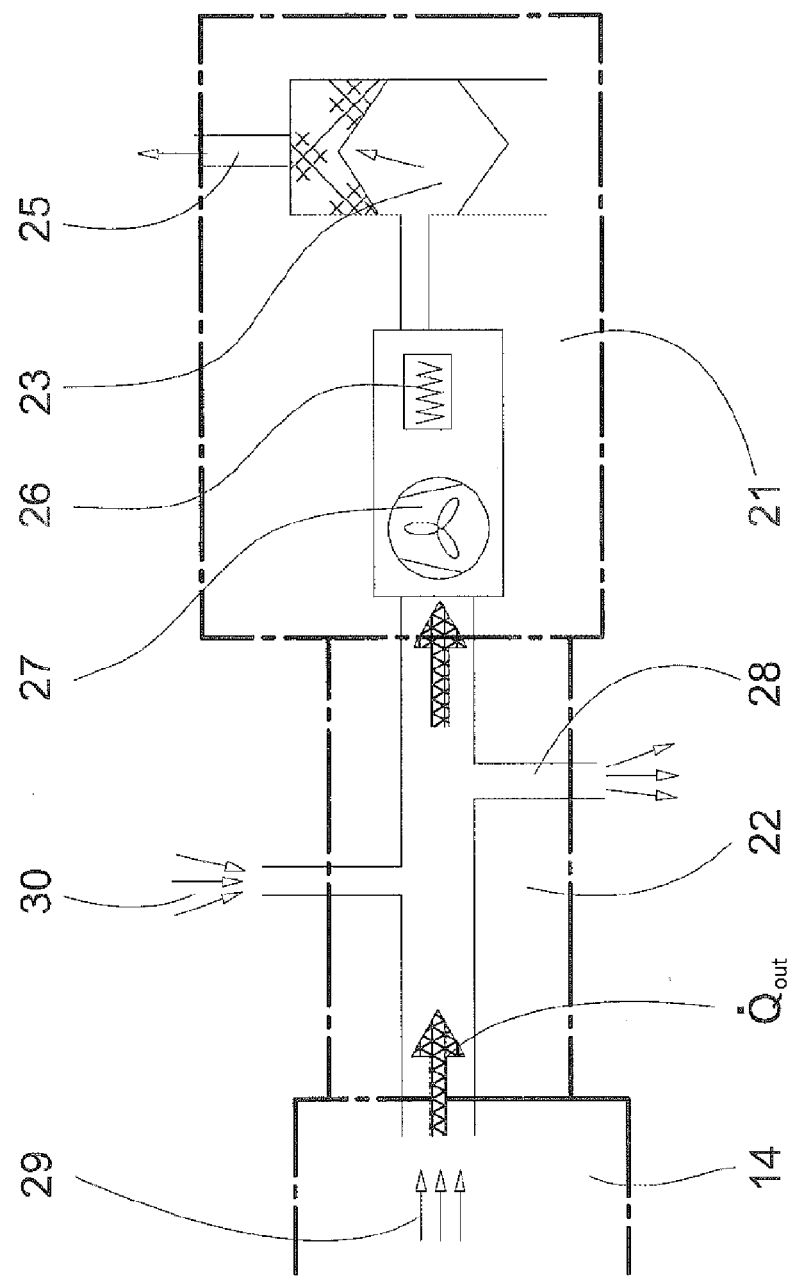
FIG. 4 shows the adjoining region of the preheating and drying process.

FIG. 4 shows the diagrammatic plan of the quantity of heat used. From the second sub region 14, the quantity of heat $\dot{Q}_{out}$ passes by means of the mixed fluid 29, in the form of the heated fluid 15 including possible extraneous fluid 16, into a transition region 22 through a transition conduit, pipe or duct. Depending on which fluid parameters are required for the further use in the preheating and drying process, fluid can be removed in the transition region 22 via a drain opening or outlet 28 duct or else further outside, external or extraneous fluid 30 can be supplied through an inlet duct before said mixed fluid is transferred to the preheating and/or drying process.

The preheating and/or drying process is indicated as an entire process region with the chain-dotted or phantom line 21. Said overall process has at least one preheating and/or drying unit, here in the form of a silo 23, by way of example. An additional fluid preparation means 24 which comprises an additional ventilator 27 and an additional heating means 26 is likewise symbolized merely by way of example. Furthermore, when the need arises, the flow velocity and/or the temperature of the fluid can be increased if this is required for the preheating and/or drying process.

LIST OF DESIGNATIONS

1 Extruder
2 Extrusion die
3 Calibrating and cooling device
4 Take-off apparatus
5 Separating apparatus
6 Air outlet
7 Filter
8 Suction apparatus
9 Plastics profile
10 Connecting pipe
11 Extrusion direction
12 First sub region
13 Connecting region
14 Second sub region
15 Fluid
16 Extraneous fluid
17 Filter
18 Temperature measuring device
19 Extraneous air duct
20 Shutoff valve
21 Preheating and/or drying process
22 Transition region between 14 and 21
23 Dry silo
24 Additional fluid preparation means
25 Air outlet 2
26 Additional heating means in 24
27 Additional ventilator
28 Drain opening
29 Mixed fluid of 15 and 16
30 Further extraneous fluid
$\dot{v}$; Flow velocity of 15 and 16
$\dot{Q}_{out}$ Quantity of heat
$T_1$ Temperature at the outlet of 12
$T_2$ Temperature at the inlet to 13
$T_3$ Temperature at the outlet of 14
$T_{max}$ Maximum temperature While this invention has been particularly shown and described with references to example embodiments thereof, it will be understood by those skilled in the art that various changes in form and details may be made therein without departing from the scope of the invention encompassed by the appended claims.

What is claimed is:

1. A method for using a quantity of heat output from an extrudate during a cooling operation in an extrusion process comprising:
    guiding air, along and/or through at least one of the extrudate and a die in a direction counter to an extrusion direction of the extrudate;
    transmitting at least some of the heat from the extrudate and/or the die to the air, forming heated air within a first sub region of a process chain, comprising the die, a calibrating and cooling device and a take-off apparatus,
    supplying the heated air from the first sub region via a connecting region comprising at least one connecting pipe, to a second sub region of the process chain that comprises an air filter and at least one suction apparatus,
    reducing temperature of the heated air from the first sub region prior to reaching the filter for preventing spontaneous ignition of the heated air and damage to the filter;
    wherein
    the temperature of the heated air does not exceed a predetermined maximum value of about 150° C., by selectively adding external air in the connecting region, to the heated air via a first external inlet forming mixed air in order to reduce the actual temperature of the heated air at least below the predetermined maximum value before said heated air is supplied to the second sub region of the process chain, and increasing flow velocity of the mixed air in relation to increasing inflow of the external air to provide a desired flow rate of the air along the at least one of the extrudate and the die, and by automatically activating safety measures if a limit temperature of about 130° C. is reached.

2. The method as claimed in claim 1, further comprising drying or pretreating plastic granules in a preheating and/or drying process following the second sub region,
    wherein, in a transition region between the second sub region and the preheating and/or drying process, flow velocity and the temperature of the mixed air can be lowered.

3. The method as claimed in claim 1, further comprising measuring the temperature of the mixed air via a temperature measuring device before the mixed air is supplied to the second sub region of the process chain, and/or, in addition, the temperature of the mixed air is measured at the outlet of the second sub region.

4. The method as claimed in claim 3, further comprising influencing the quantity of the external air via a shutoff valve.

5. The method as claimed in claim 4, further comprising controlling and/or regulating the quantity of external air in dependence on the temperature of the heated air exiting the first sub region in order to keep the temperature of the mixed air below the maximum temperature entering the second sub region.

6. The method as claimed in claim 1, wherein, when the limit temperature is reached, an alarm signaling device is activated, or wherein, when the maximum temperature is reached, an emergency shutdown of the system is triggered.

7. The method as claimed in claim 2, further comprising increasing or minimizing the flow velocity of the mixed air by the suction apparatus.

8. The method as claimed in claim 1, wherein the quantity of heat output from the first sub region of the process chain is substantially identical to the quantity of heat output from the second sub region at the end of the process chain.

9. The method as claimed in claim 7, further comprising measuring the volumetric flow of the heated air and/or the volumetric flow of the external air.

10. The method as claimed in claim 9, further comprising controlling and/or regulating the suction power of the suction apparatus in dependence on the volumetric flow measurement of the heated air and/or external air.

11. The method as claimed in claim 2, wherein, in the transition region, further external air can be added or the mixed air can be drained.

12. The method as claimed in claim 1, wherein the temperature of the mixed air from the second sub region at the end of the process chain is lower than the temperature of the heated air at the outlet of the first sub region, the quantity of heat output remaining substantially constant.

13. The method of claim 2 further comprising selectively further cooling the mixed air or venting the mixed air in the transition region that has a second external inlet and an outlet, downstream of the second sub region.

\* \* \* \* \*